United States Patent Office 2,865,806
Patented Dec. 23, 1958

2,865,806

SOLIDIFIED AIR ODOR CONTROL LIQUIDS

Jack J. Bulloff, Dayton, Ohio, assignor to Interstate Sanitation Company, Inc., Cincinnati, Ohio, a corporation of Ohio No Drawing. Application August 5, 1955
Serial No. 526,771

21 Claims. (Cl. 167—42)

This invention relates to normally liquid air odor control agents in hard, solid form.

My application Serial Number 526,772 filed concurrently herewith discloses liquid air odor control agents or compositions comprising a menthadiene or a commercial product having a high menthadiene content stabilized for the retardation or prevention of gumming and odor staling on evaporation under normal conditions. The compositions may contain added deodorants and/or reodorants.

There are various circumstances under which liquid or even gelled air odor control agents are impractical or undesirable.

The object of this invention is to provide the agents or compositions in hard, solid form so that they are adapted to use under a wider range of conditions and involve less service and installation costs than the liquids.

Conversion of the air odor control liquids into solid form presented the problem that solids of high melting point are required and, usually, liquids of low freezing point, such as the menthadienes, do not readily form a solid of high melting point when a melt thereof is made with a similar solid of higher melting point, and then cooled.

It is found, however, in accordance with the invention, that if normally liquid menthadiene or crude extract containing it in high concentration is mixed with a solid such that micellular gel formation occurs, the product obtained by melting the solid in the air odor control liquid and then solidifying the blend by cooling is a hard solid which may contain a large proportion by weight of the air odor control liquid that evaporates from the solid into the air at ordinary temperatures encountered in use, to deodor and/or reodor the same.

The solidified air odor control agents must not soften at summer temperature, must be readily released from the mold, and must be relatively low in cost in order to be commercially competitive.

It was found that solid air odor control agents of the required hardness and other characteristics can be obtained by blending the air odor control liquid comprising the menthadiene and, preferably, an added anti-oxidant, with selected solidifying agents, under heating, and then cooling the blend.

The specific solidifying agents to be melted or blended with the liquids are polymeric materials soluble in the liquids at temperatures of 160° F.–250° F. and having Dow melt indices of 0.1 to 35. They include certain polyethylenes and ethyl celluloses, as well as certain other moldable plastic materials.

Note.—The Dow melt index is a number obtained by measuring the rate at which the plastic can be extruded through an orifice of given dimension at a given temperature, and is inversely proportional to the molecular weight of the solidifying agent.

The solidifying agents specified yield hard solids which do not soften at summer temperatures. Moreover, these agents permit "bleeding" of the menthadiene from the molded product, in the mold, to a sufficient extent as to function as a lubricant which facilitates removal of the product from the mold.

The melt index is critical. I have found that agents having melt indices below 0.1 or higher than 35 are unsatisfactory. The former require prohibitively high temperatures for melting thereof in the air odor control liquid. With the latter, the amount of such liquid which can be included in the solid product is limited.

The following examples are given to illustrate specific embodiments of the invention, it being understood that these examples are not intended as limitative.

*Example I*

About 375 parts of "Alathon 10" (a polyethylene having a Dow melt index of 0.1 marketed by Du Pont) were melted in a glass mold at 180° F. in 625 parts of commercial dipentene. The melt was cooled slowly and tested for consistency, ease of release from the glass mold, and the extent of bleeding out of the dipentene. It was found that the molded product was hard, the extent of bleeding was noticeable, and the release from the mold excellent.

Bleeding or exudation of the dipentene or other air odor control liquid to the surface of the molded product is an important feature of the invention. The exuded liquid serves as a mold lubricant to facilitate ready release from the mold and eliminates the need to include extraneous mold lubricants which interfere adversely with the odoring and reodoring properties of the products. The polymeric solidifying agents having melt indices in the range 0.1–35 yield products from which about 0.6 to 3.3% (on the molded product weight) of the air odor control liquid bleed to the surface. This is sufficient to insure the ready release from the mold which is vitally important to large scale commercial manufacture.

*Example II*

About 375 parts of "Q940" (a polyethylene having a Dow melt index of 0.2 and marketed by Dow Chemical Co.) were melted in a glass vessel at 180° F. in 625 parts of commercial dipentene. The melt was then poured into an aluminum mold of block shape and slowly cooled. The molded blocks obtained were very hard and the dipentene exuded to the surface in an amount such that the release from the mold was excellent.

*Example III*

Example I was repeated except that 375 parts of Q940.2 (a polyethylene of Dow melt index 2.0, marketed by Dow Chemical Co.) were melted in the dipentene. Hard solid products from which the dipentene exuded during the cooling to give excellent mold release were obtained.

*Example IV*

Example I was repeated except that 375 parts of Q941.4 (a polyethylene of melt index 20 marketed by Dow Chemical Co.) were melted in the dipentene. Solid products of satisfactory hardness and very good mold release were obtained.

The presence of small amounts (0.1% to 20%) of dyes, deodorants, reodorants, essential oils and anti-oxidants in the air odor control liquids does not impair the hardness of products obtained by melting the polyethylenes of Examples I–IV in the modified liquids, as is apparent from Example V below.

*Example V*

The air odor control liquids used were:

A commercial terpene containing 50% of dipentene;
Commercial dipentene mixed with a citrus oil reodorant;

A dyed "Menthadiene" mixed with the mildly odorous hydrocarbon solvent, Shell Sol 72 (a petroleum fraction marketed by Shell Development Co.);

A dyed "Menthadiene" mixed with "Soltrol 130" (a completely odorless petroleum fraction marketed by Phillips Petroleum Co.);

A dyed "Menthadiene" mixed with various odorless aliphatic and aromatic solvents.

Each of the liquids contained a stabilizing anti-oxidant in an amount varying between 0.001 and 3.0%. The anti-oxidants used were:

Tenox BHA (butyl hydroxyanisole; marketed by Tennessee Eastman Co.);

National Aniline B—marketed by National Aniline Div. of Allied Chemical and Dye Corp. for use as anti-skinning agent in paint;

Sustane 3-F—mixture of tertiary butyl hydroxyanisole with synergist and neutral solvent marketed by Universal Oil Products Co.

The solidifying agents used were the polyethylenes "Alathon 10," "Q940," "Q940.2" and "Q941.3," (melt index 7.0) and "Q941.4."

About 375 parts of each of the polyethylenes were dissolved in 625 parts of each of the air odor control liquids listed. Temperatures of 180° F., 200° F., 230° F. or 250° F. were used to dissolve the polyethylene in the liquid. On cooling of the melt, molded blocks of good hardness were obtained. The percent liquid which bled to the surface of the blocks and served as mold lubricant varied between 0.9 and 2.0. The anti-oxidant potency and the stability of the air odor control liquid imparted by the added anti-oxidant, was not impaired by the melting and cooling, or by the polyethylene.

*Example VI*

Example V was repeated using the polyethylenes and stabilized air odor control liquid or modified air odor control liquid in the following relative amounts, the parts being by weight:

| Polyethylene | Liquid |
|---|---|
| 282 | 718 |
| 33 | 67 |
| 3 | 7 |
| 2.5 | 7.5 |
| 26 | 74 |
| 23 | 77 |
| 20 | 80 |
| 19 | 81 |
| 18 | 82 |

In general, the solidifying agents of the lower melt indices in the range 0.1–35, require longer heating times for melting thereof in the air odor control liquids, and slightly higher temperatures are required for non-terpenoid solvents than are suitable for use with the menthadienes. Other factors being equal, the lower the melt index for the solidifying agent in the range 0.1–35, the harder are the molded products obtained. Use of the solidifiers of the lower melt indices also permits the inclusion of larger amounts of inert hydrocarbon solvent without softening of the molded product.

The air odor control liquid component of the solidified blends of the invention is a menthadiene, preferably one containing non-conjugated double bonds not more than one of which occurs outside the 6-carbon ring. A pure menthadiene, such as d, or l-limonene, or the racemic d,l-limonene (dipentene) may be used. Generally, however, commercial products or extracts having a concentration of 40% to 95% of the menthadiene are used because of the ready availability and low cost thereof.

Thus there may be used citrus oil products such as the product marketed as "Menthadiene" by Florida Molasses Co. and which contains 95% d-limonene, as well as coniferous wood extracts containing about 50% of dipentene.

The menthadiene, and particularly commercial or technical grades thereof which contain terpinenes and terpinolenes in amounts such that the liquid tends to form gums in comparatively large amount on evaporation and to stale in odor, are stabilized to reduce the gumming and odor staling.

The stabilizing agent may be an anti-oxidant in an amount of 0.001% to 5.0%, preferably 0.001% to 0.3% by weight. Any anti-oxidant soluble in and compatible with the air odor control liquid may be used. Anti-oxidants may occur naturally in the commercial products containing 40% to 95% of the menthadiene. Such extracts may be used without the addition of further anti-oxidant, or an anti-oxidant may be added to a total quantity preferably not higher than 5%.

The suitable anti-oxidants include alkylated cresols, phenols, anisoles, aldoximes and ketoximes.

Specific examples of anti-oxidants which may be used include:

NDGC—essentially nor-dihydroguiaretic acid; marketed by Nordigard Corp.

BHA—essentially butylated hydroxyanisole; marketed by Tennessee Eastman Co.

Compound 19—essentially 2,2' - methylene - d - p - cresol; marketed by Sindar Corp.

Sustanes #1, #1F, #3, #6—mixtures of tertiary butyl hydroxyanisoles with synergists in neutral solvents; marketed by Universal Oil Products Co.

dbpc—food grade ditertiary butyl-p-cresol; marketed by Koppers Company.

Propyl gallate

Ethyl gallate

"Voidox"—modified food grade tertiary butylated phenol; marketed by Guardian Chemical Corp.

One way to reduce the quantity of anti-oxidant required to stabilize the commercial menthadienes is to mix them with an inert hydrocarbon solvent having a vapor pressure similar to that of the partial vapor pressure of the menthadiene in the solidified product. When the inert solvent, such as Soltrol 130 (a completely odorless petroleum fraction marketed by Phillips Petroleum Company) or Shell Sol 72 (a mildly odorous petroleum fraction marketed by Shell Development Co.) is mixed with a commercial menthadiene amounts of the anti-oxidants between 0.001% and 2 or 3% are satisfactory and the solid anti-oxidants may be used in those amounts. The hydrocarbon solvent may be used in an amount of 5 to 20% by weight.

The amount of anti-oxidant required for retarding or minimizing gumming and odor staling may also be reduced by diluting the commercial menthadiene with a pure menthadiene or with a commercial menthadiene having a very high (90–95%) concentration of the menthadiene. For example a coniferous wood extract containing 50% dipentene may be diluted with 5% to 20% or even equal parts of pure d- or l-limonene, or pure dipentene. Or the commercial dipentene may be diluted with "Menthadiene" containing 95% of d-limonene.

The relatively small proportion of anti-oxidant is also satisfactory when the crude or commercial menthadiene is mixed with both a pure limonene or a product having a high limonene concentration, and the inert hydrocarbon solvent. For example, a three-component system comprising commercial dipentene (50% dipentene concentration) a source of d- or l-limonene containing 90–95% of the optically active isomer, and the inert hydrocarbon solvent having a vapor pressure similar to that of the dipentene and limonene, can be stabilized with the small amounts of anti-oxidant.

The stabilized commercial products or the pure products may comprise added odor masking substances. The masking substances used are soluble in or miscible with the citrus oil or wood extract in amounts between 5% and 20%, with or without the presence of hydrocarbon solvent. Perfume, essential, or aromatic oils may be used as the reodoring component.

The stabilized liquid menthadienes or mixtures thereof, the commercial products containing the menthadienes or mixtures thereof, and the products modified by the inclusion of dyes, hydrocarbon solvents, deodorants, reodorants and odor masking materials may all be solidified in the desired shape by dissolving a solidifying agent in accordance with the invention therein under heating, introducing the melt into a mold of desired shape and size, and cooling the mixture until it is set as a hard solid having the shape and size of the mold.

As will be apparent from the examples given herein, the polymeric solidifying agent of Dow melt index number between 0.1 and 35, may be used in varying amounts. In general, these agents may be used to solidify the liquid menthadiene or mixtures containing it in amounts between 2% and 10% on the menthadiene weight.

In addition to the polyethylenes mentioned, and ethocel, other polyethylenes and polyalkenes including those made by the Ziegler process may be used for solidifying the air odor control liquids.

The hard, solid, molded air odor control agents may be used in any place where it is desired to deodor and/or reodor air or to mask air odors. The products may be used without a container or may be placed in any suitable porous container which protects the product while permitting passage of the vapors thereof.

The liquids converted to solid form by the invention may be given special properties adapting them to special uses by the addition of modifying agents. Thus, to confer mothicidal properties on the products, agents such as paradichlorobenzene, orthodichlorobenzene, or metadichlorobenzene, a mixture of para- and ortho-dichlorobenzene, or hexachloroethane either by itself or in synergistic mixture with any of the dichlorobenzenes mentioned, may be dissolved in the liquid. Insecticides such as "Thanite" (a substituted terpene marketed by Hercules Powder Co.) may be dissolved in the air odor control liquid to render the same useful as an insecticide. Other volatile insecticides soluble in the liquid comprising the menthadiene may be used. Small amounts of these special modifying agents, as between 2% and 10%, may be used.

Since various changes and modifications may be made in the details disclosed without departing from the spirit and scope of the invention, it is to be understood that it is not intended to limit the invention except as defined in the appended claims.

What is claimed is:

1. A solid air odor controlling composition consisting essentially of the product obtained by dissolving a solid moldable material selected from the group consisting of polyethylene and ethyl cellulose, and having a Dow melt index number between 0.1 and 35 in liquid menthadiene, the constituents being admixed at a temperature of 160° F. to 250° F., and cooling the solution to form a solid product.

2. A solid air odor controlling composition consisting essentially of the product obtained by dissolving a solid polyethylene having a Dow melt index number between 0.1 and 35 in liquid menthadiene, the constituents being admixed at a temperature of 160° F. to 250° F., and cooling the solution to solidify the same.

3. A solid air odor controlling composition consisting essentially of the product obtained by dissolving a solid ethyl cellulose having a Dow melt index number between 0.1 and 35 in liquid menthadiene, the constituents being admixed at a temperature of 160° F. to 250° F., and cooling the solution to solidify the same.

4. A solid air odor controlling composition consisting essentially of the product obtained by dissolving solid moldable polymeric material selected from the group consisting of polyethylene and ethyl cellulose, and having a Dow melt index number between 0.1 and 35 in a liquid terpene containing 50% to 95% of a menthadiene, the constituents being admixed at a temperature of 160° F. to 250° F., and cooling the solution to solidify the same.

5. A solid air odor controlling composition consisting essentially of the product obtained by dissolving a solid polyethylene having a Dow melt index number between 0.1 and 35 in a liquid terpene containing 50% to 95% of an optically active limonene, the constituents being admixed at a temperature of 160° F. to 250° F., and cooling the solution to solidify the same.

6. A solid air odor controlling composition consisting essentially of the product obtained by dissolving a solid polymeric material selected from the group consisting of polyethylene and ethylene cellulose, and having a Dow melt index number between 0.1 and 35 in a liquid citrus oil containing about 95% of α-limonene, the constituents being admixed at a temperature of 160° F. to 250° F., and cooling the solution to solidify the same.

7. A solid air odor controlling composition consisting essentially of the product obtained by dissolving a solid polymeric material selected from the group consisting of polyethylene and ethyl cellulose, and having a Dow melt index number between 0.1 and 35 in a liquid terpene containing 50% to 95% of dipentene, the constituents being admixed at a temperature of 160° F. to 250° F., and cooling the solution to solidify the same.

8. A solid air odor controlling composition consisting essentially of the product obtained by dissolving a solid polymeric material selected from the group consisting of polyethylene and ethyl cellulose, and having a Dow melt index number between 0.1 and 35 in a liquid coniferous wood extract containing about 50% of dipentene, the constituents being admixed at a temperature of 160° F. to 250° F., and cooling the solution to solidify the same.

9. A solid air odor controlling composition consisting essentially of the product obtained by dissolving a solid polymeric material selected from the group consisting of polyethylene and ethyl cellulose, and having a Dow melt index number between 0.1 and 35 in liquid menthadiene containing an anti-oxidant, the constituents being admixed at a temperature of 160° F. to 250° F., and cooling the solution to solidify the same.

10. A solid air odor controlling composition consisting essentially of the product obtained by dissolving a solid polymeric material selected from the group consisting of polyethylene and ethyl cellulose, and having a Dow melt index number between 0.1 and 35 in liquid menthadiene containing an anti-oxidant and an inert hydrocarbon solvent having a vapor pressure substantially the same as the partial vapor pressure of the menthadiene in the solid composition, the constituents being admixed at a temperature of 160° F. to 250° F., and cooling the solution to solidify the same.

11. A solid air odor controlling composition consisting essentially of the product obtained by dissolving a solid polymeric material selected from the group consisting of polyethylene and ethyl cellulose, and having a Dow melt index number between 0.1 and 35 in a liquid terpene containing 50% to 95% of a menthadiene, a small amount of pure menthadiene, and an anti-oxidant, the constituents being admixed at a temperature of 160° F. to 250° F., and cooling the solution to solidify the same.

12. A solid air odor controlling composition consisting essentially of the product obtained by dissolving a solid polyethylene having a Dow melt index number between 0.1 and 35 in liquid stabilized menthadiene, the constituents being admixed at a temperature of 160° F. to 250° F., and cooling the solution to solidify the same.

13. A solid air odor controlling composition consisting essentially of the product obtained by dissolving a solid polyethylene having a Dow melt index number between 0.1 and 35 in a citrus oil having a high limonene content and containing a stabilizing anti-oxidant, the constituents being admixed at a temperature of 160° F. to 250° F., and cooling the solution to solidify the same.

14. A solid air odor controlling composition consisting essentially of the product obtained by dissolving a solid polyethylene having a Dow melt index number between 0.1 and 35 in a liquid coniferous wood extract having a high dipentene concentration and containing a stabilizing anti-oxidant, the constituents being admixed at a temperature of 160° F. to 250° F., and cooling the solution to solidify the same.

15. A solid air odor controlling composition consisting essentially of the product obtained by dissolving a solid polyethylene having a Dow melt index number between 0.1 and 35 in a mixture of coniferous wood extract having a high dipentene concentration, a citrus oil having a high α-limonene concentration, an anti-oxident and an inert hydrocarbon solvent having a vapor pressure substantially the same as the partial vapor pressure of the dipentene and limonene in the solid product, the constituents being admixed at a temperature of 160° F. to 250° F., and cooling the solution to solidify the same.

16. A solid air odor controlling composition consisting essentially of the product obtained by dissolving a solid polyethylene having a Dow melt index number between 0.1 to 35 in a mixture of a coniferous wood extract containing about 50% of dipentene, a citrus oil containing about 95% of α-limonene, and an anti-oxidant, the constituents being admixed at a temperature of 160° F. to 250° F., and cooling the solution to solidify the same.

17. A solid air odor controlling composition consisting essentially of the product obtained by dissolving a solid polyethylene having a Dow melt index number between 0.1 and 35 in a mixture of dipentene, an anti-oxidant, and an added odor-controlling agent for the vapors of the dipentene, the constituents being admixed at a temperature of 160° F. to 250° F., and cooling the solution to solidify the same.

18. A solid air odor controlling composition consisting essentially of the product obtained by dissolving a solid polyethylene having a Dow melt index number between 0.1 and 35 in a mixture of an optically active limonene, an anti-oxidant, and an added odor controlling agent for the vapors of the limonene, the constituents being admixed at a temperature of 160° F. to 250° F., and cooling the solution to solidify the same.

19. A solid air odor controlling composition consisting essentially of the product obtained by dissolving a solid polyethylene having a Dow melt index number between 0.1 and 35 in a mixture of a coniferous wood extract having a high dipentene content, an anti-oxidant, and an inert hydrocarbon solvent having a vapor pressure substantially the same as the partial vapor pressure of the dipentene in the solid composition, the constitutents being admixed at a temperature of 160° F. to 250° F., and cooling the solution to solidify the same.

20. The method of making solid air odor controlling compositions which do not melt at summer temperatures and from which a normally liquid menthadiene is volatilized at ordinary temperatures, which comprises dissolving in liquid menthadiene a solid polymeric material selected from the group consisting of polyethylene and ethyl cellulose, and having a Dow melt index number between 0.1 and 35 and soluble in the menthadiene at a temperature of 160° F. to 250° F., and cooling the solution to solidify the same.

21. The method of making solid air odor controlling compositions which do not melt at summer temperatures and from which normally liquid dipentene is volatilized at ordinary temperatures, which comprises dissolving in a liquid terpene containing 50% to 95% of dipentene a solid polymeric material selected from the group consisting of polyethylene and ethyl cellulose, and having a Dow melt index number between 0.1 and 35 and soluble in the terpene at a temperature of 160° F. to 250° F., and cooling the solution to solidify the same.

References Cited in the file of this patent

UNITED STATES PATENTS

| 2,324,347 | Anderson | July 13, 1943 |
| 2,441,553 | Britton | May 18, 1948 |
| 2,628,187 | Frohmader | Feb. 10, 1953 |

FOREIGN PATENTS

| 125,308 | Germany | 1901 |
| 425,309 | Great Britain | Mar. 7, 1935 |
| 496,288 | Great Britain | Nov. 21, 1938 |

OTHER REFERENCES

Lesser: Soap and Sanitary Chemicals, May 1947, pp. 131, 133, 135, 137 and 151; "Air Deodorizers."